US008504507B1

(12) United States Patent
Srinivasaiah

(10) Patent No.: US 8,504,507 B1
(45) **Date of Patent: *Aug. 6, 2013**

(54) INFERRING DEMOGRAPHICS FOR WEBSITE MEMBERS

(75) Inventor: Manjunath Srinivasaiah, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/289,909

(22) Filed: Nov. 4, 2011

Related U.S. Application Data

(63) Continuation of application No. 11/934,226, filed on Nov. 2, 2007, now Pat. No. 8,073,807.

(51) Int. Cl.
*G06F 17/00* (2006.01)
*G06N 5/02* (2006.01)

(52) U.S. Cl.
USPC .......................................................... 706/46

(58) Field of Classification Search
None
See application file for complete search history.

(56) References Cited

U.S. PATENT DOCUMENTS

| | | | |
|---|---|---|---|
| 6,041,311 | A | 3/2000 | Chislenko et al. |
| 6,438,579 | B1 | 8/2002 | Hosken |
| 2005/0256756 | A1 | 11/2005 | Lam et al. |
| 2005/0267766 | A1 | 12/2005 | Galbreath et al. |
| 2006/0106780 | A1 | 5/2006 | Dagan |
| 2007/0073681 | A1 | 3/2007 | Adar et al. |
| 2008/0065701 | A1 | 3/2008 | Lindstrom et al. |
| 2008/0104225 | A1 | 5/2008 | Zhang et al. |
| 2008/0120308 | A1 | 5/2008 | Martinez et al. |
| 2008/0126411 | A1 * | 5/2008 | Zhuang et al. ............. 707/104.1 |
| 2008/0155078 | A1 | 6/2008 | Parkkinen et al. |
| 2008/0215607 | A1 | 9/2008 | Kaushansky et al. |
| 2008/0242279 | A1 | 10/2008 | Ramer et al. |
| 2008/0263053 | A1 * | 10/2008 | Hull ................................ 707/10 |
| 2008/0270425 | A1 | 10/2008 | Cotgreave |
| 2009/0029687 | A1 | 1/2009 | Ramer et al. |

(Continued)

FOREIGN PATENT DOCUMENTS

| | | | |
|---|---|---|---|
| WO | 2006004455 | A2 | 4/2006 |

OTHER PUBLICATIONS

MacKinnon et al. "Age and Geographic Inferences of the LiveJournal Social Network", 23 International Conference on Machine Learning, 2006, 8 pages.*

(Continued)

*Primary Examiner* — Kakali Chaki
*Assistant Examiner* — Ababacar Seck
(74) *Attorney, Agent, or Firm* — McDermott Will & Emery LLP

(57) ABSTRACT

Methods and apparatus, including computer program products, implementing and using techniques for providing content based on an estimated actual age. A set of related members is identified for a first member of a social networking website. Each member in the set of related members is connected to the first member in the social network website. Age information for members in the set of related members in the set of related members is examined. When a threshold number of members in the set of related members have an estimated actual age within a certain age range, an actual age of the first member is estimated based on the estimated actual age of the members in the set of related members. Content is provided to the first member based on the first member's estimated actual age. Techniques for performing a sentiment analysis based on an estimated actual age are also described.

26 Claims, 1 Drawing Sheet

U.S. PATENT DOCUMENTS

| | | | | |
|---|---|---|---|---|
| 2009/0061406 A1* | 3/2009 | Clayton et al. | ................ | 434/322 |
| 2010/0164957 A1* | 7/2010 | Lindsay et al. | ............... | 345/440 |
| 2010/0205037 A1* | 8/2010 | Besehanic | ....................... | 705/10 |

OTHER PUBLICATIONS

USPTO Office Action (Non-Final) dated Feb. 10, 2011. U.S. Appl. No. 12/111,017, files Apr. 28, 2008.

comScore, Inc. Home page, Product pages: Ad Metrix , [online]. comScore, Inc. [retrieved on Sep. 2, 2008]. Retrieved from the Internet http://www.comscore.com/, 1 page.

QuestionPro Home page, Product page: Survey Software [online]. QuestionPro. [retrieved on Sep. 2, 2008]. Retrieved from the Internet: <http://www.questionpro.com/>, 32 pages.

People's Daily Online, 'MySpace steps up security for teen users' [online] [retrieved on Jul. 17, 2009. Retrieved from the Internet:http://english.peopledaily.com.cn/200606/23/eng20060623_276550.html, 2 pages.

NetIDme Home page, 'NetIDme provides secure age and identify verification for the internet' [online] [retrieved on Jul. 17, 2009]. Retrieved from the Internet: http://web.archive.org/web/20070629100031/http://netideme.net/netidauthrenticate.htm, 2 pages.

comScore, Inc. Home page, Product pages: Brand Metrix, [online]. comScore, Inc. [retrieved on Sep. 2, 2008]. Retrieved from the Internet http://www.comscore.com/, 1 page.

comScore, Inc. Home page, Product pages: Campaign Metrix, [online]. comScore, Inc. [retrieved on Sep. 2, 2008]. Retrieved from the Internet http://www.comscore.com/, 1 page.

comScore, Inc. Home page, Product pages: Marketer, [online]. comScore, Inc. [retrieved on Sep. 2, 2008]. Retrieved from the Internet http://www.comscore.com/, 1 page.

comScore, Inc. Home page, Product pages: Marketing Solutions, [online]. comScore, Inc. [retrieved on Sep. 2, 2008]. Retrieved from the Internet http://www.comscore.com/, 1 page.

comScore, Inc. Home page, Product pages: Media Metrix Campaign R/F™, [online]. comScore, Inc. [retrieved on Sep. 2, 2008]. Retrieved from the Internet http://www.comscore.com/, 1 page.

comScore, Inc. Home page, Product pages: U.S. Hispanic Services, [online]. comScore, Inc. [retrieved on Sep. 2, 2008]. Retrieved from the Internet http://www.comscore.com/, 1 page.

comScore, Inc. Home page, Product pages: LocalScore, [online]. comScore, Inc. [retrieved on Sep. 2, 2008]. Retrieved from the Internet http://www.comscore.com/, 2 pages.

comScore, Inc. Home page, Product pages: Local Market Reporting, [online]. comScore, Inc. [retrieved on Sep. 2, 2008]. Retrieved from the Internet http://www.comscore.com/, 1 page.

comScore, Inc. Home page, Product pages: Online Search Solutions, [online]. comScore, Inc. [retrieved on Sep. 2, 2008]. Retrieved from the Internet http://www.comscore.com/, 1 page.

comScore, Inc. Home page, Product pages: Plan Metrix, [online]. comScore, Inc. [retrieved on sep. 2, 2008]. Retrieved from the Internet http://www.comscore.com/, 1 page.

comScore, Inc. Home page, Product pages: Segment Metrix H/M/L, [online]. comScore, Inc. [retrieved on Sep. 2, 2008]. Retrieved from the Internet http://www.comscore.com/, 1 page.

comScore, Inc. Home page, Product pages: Video Metrix, [online]. comScore, Inc. [retrieved on Sep. 2, 2008]. Retrieved from the Internet http://www.comscore.com/, 1 page.

comScore, Inc. Home page, Product pages: Widget Metrix [online]. comScore, Inc. [retrieved on Sep. 2, 2008]. Retrieved from the Internet http://www.comscore.com/, 1 page.

'Online Survey Software' [online]. QuestionPro 2006, [retrieved on Sep. 2, 2008]. Retrieved from the Internet: http://www.questionpro.com/products/index.html, 2 pages.

'Survey Software' [online]. QuestionPro 2007, [retrieved on Sep. 2, 2008]. Retrieved from the Internet: http://www.questionpro.com, 10 pages.

'Security and Privacy' [online]. QuestionPro 2006, [retrieved on Sep. 2, 2008]. Retrieved from the Internet: http://www.questionpro.com/security/index.html, 1 page.

'Testimonials' [online]. QuestionPro 2006, [retrieved on Sep. 2, 2008]. Retrieved from the Internet: http://www.questionpro.com/clients/comments.html, 7 pages.

'Sample Surveys-Sample Survey Questions-Survey Questions' [online]. QuestionPro 2006, [retrieved on Sep. 2, 2008]. Retrieved from the Internet: http://www.questionpro.com/sample/index.html, 2 pages.

'Online Research Made Easy', [brochure], QuestionPro 2007, 8 pages.

'Support Vector Machine' [online], Wikipedia, [published on Sep. 13, 2006] [retrieved on May 21, 2009]. Retrieved from the Internet: http://web.archive.org/web/20060913000000/http://en.wikipedia.org/wiki/support_vector_machine, 4 pages.

Marks, Paul 'New Software can Identify You from Your Online Habits' [online], NewScientist Tech, [published on May 16, 2007] [retrieved on May 21, 2009]. Retrieved from: http://www.newscientist.com/article/mg19426046.400, 4 pages.

Macskassy, Sofus A., and Provost, Foster, 'A Simple Relational Classifer' NYU Stern School of Business [published 2003], 13 pages.

'Note on Terminology' [online], Wikipedia, [published on Sep. 13, 2006], [retrieved on May 21, 2009]. Retrieved from: http://web.archive.org/20060913000000/http://en.wikipedia.org/wiki/decision_tree, 1 page.

Rudin, Cynthia, Daubechies, Ingrid and Schapire, Robert E., 'Dynamics of AdaBoost' May 2005, NSF Postdoc, BIO Division, Center for Neural Science, NYU, 62 pages.

comScore, Inc. Home page, Product pages: comscore,Inc.—a Global Internet Information Provider, [online]. comScore, Inc. [retrieved on Sep. 2, 2008]. Retrieved from the Internet http://www.comscore.com/, 1 page.

"MySpace steps up security for teen users." People's Daily Online. http://english.peopledaily.com.cn/200606/23/eng20060623_276550.html. Downloaded Jul. 17, 2009.

Herlocker, Jonathan L., Konstan, Joseph A., Terveen, Loren G., and Riedl, John T., 'Evaluating Collaborative Filtering Recommender Systems' ACM Transactions on Information Systems, vol. 22, No. 1, Jan. 2004, pp. 1-53.

Yang, Wan-Shiou, Dia, Jia-Ben, Cheng, Hung-Chi, and Lin, Hsing-Tzu, 'Mining Social Networks for Targeted Advertising' Proceedings of the 39th Hawaii International Conference on System Sciences-2006, pp. 1-10.

"Binomial distribution," PlanetMath.Org [online], Retrieved from the Internet: <http://planetmath.orgi?op=getobj&from=objects&name=BernoulliDistribution2>, retrieved on Jun. 15, 2007, 4 pages.

"Bernoulli distribution," Wikipedia [online], Retrieved from the Internet: <http://en.wikipedia.org/wiki/Bernoulli_distribution>, retrieved on Sep. 22, 2009, published on Aug. 28, 2009, 2 pages.

"Expectation-maximization algorithm," Wikipedia [online], Retrieved from the Internet: <http://en.wikipedia.org/wiki/Expectation-maximization_algorithm>, retrieved on Jun. 15, 2007, 9 pages.

"Logit," Wikipedia [online], Retrieved from the Internet: <http://en.wikipedia.org/wiki/Logit>, retrieved on Aug. 2, 2007, 2 pages.

Hu, Jian, et al., "Demographic Prediction Based on User's Browsing Behavior," International World Wide Web Conference Committee (IW3C2), WWW 2007, May 8-12, 2007, Banff, Alberta, Canada, 10 pages.

USPTO U.S. Appl. No. 11/934,226 Non-Final Office Action dated Sep. 29, 2010.

USPTO U.S. Appl. No. 11/934,226 Final Office Action dated Apr. 7, 2011.

USPTO U.S. Appl. No. 11/934,226 Notice of Allowance dated Sep. 22, 2011.

* cited by examiner

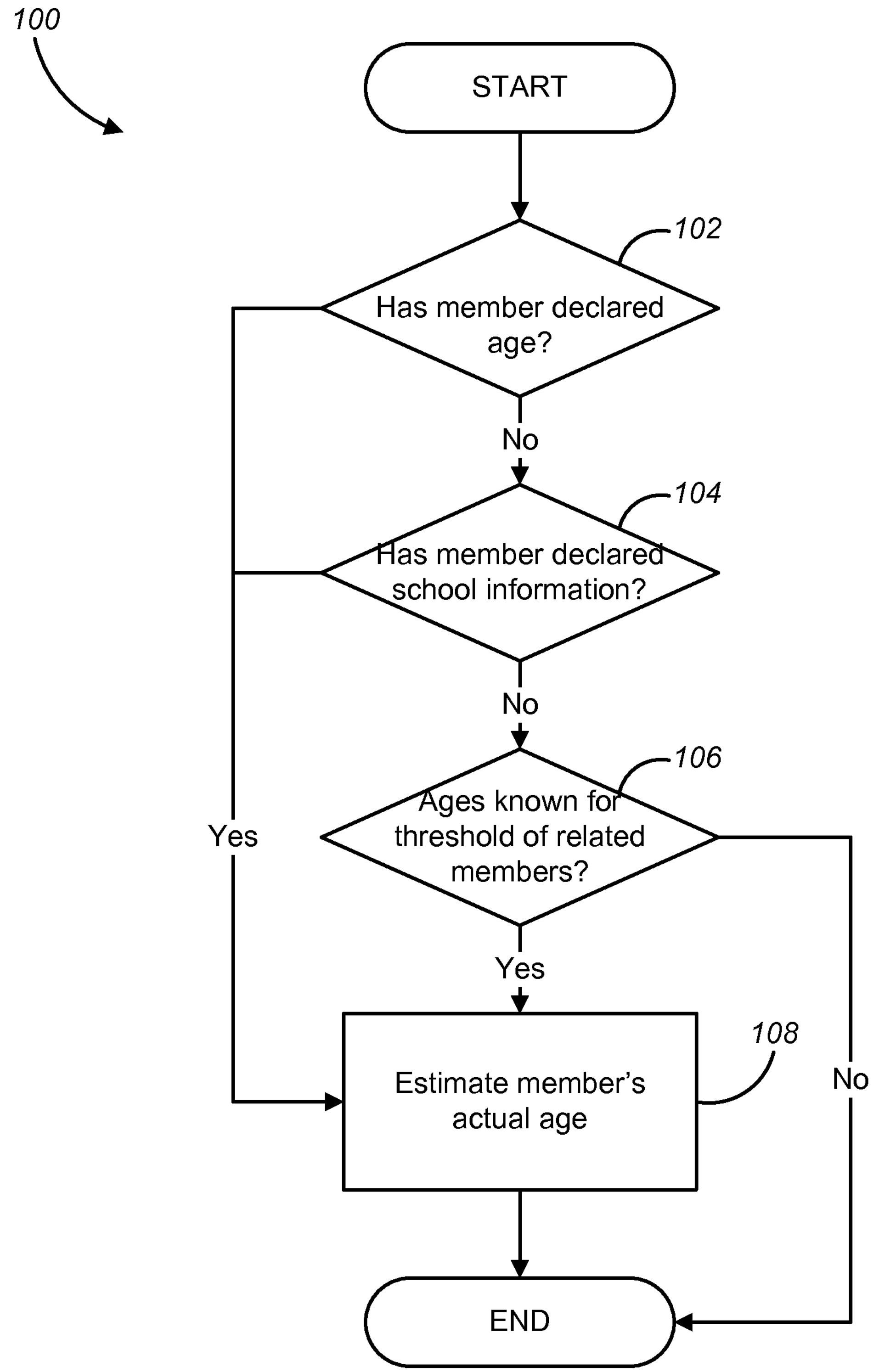
100
START
102
Has member declared age?
No
104
Has member declared school information?
No
106
Ages known for threshold of related members?
Yes
Yes
No
108
Estimate member's actual age
END

INFERRING DEMOGRAPHICS FOR WEBSITE MEMBERS

CROSS-REFERENCE TO RELATED APPLICATIONS

This application is a continuation of U.S. patent application Ser. No. 11/934,226, filed on Nov. 2, 2007, and titled "Inferring Demographics for Website Members", the content of which is incorporated herein by reference.

BACKGROUND

This invention relates to inferring information about website users. Social networking websites, or websites with a social networking-like structure, are becoming increasingly popular meeting places for Internet users. The first social networking website, Classmates.com, started operating in 1995 and has been followed by many other social networking websites that provide similar functionality. It is estimated that combined there are now several hundred social networking sites.

Typically, in these social networking communities, an initial set of founders sends out messages inviting members of their own personal networks to join the site. New members repeat the process, growing the total number of members and connections in the network. The social networking websites then offer features such as automatic address book updates, viewable profiles, the ability to form new connections through "introduction services," and other forms of online social connections, such as business connections. Newer social networking websites on the Internet are becoming more focused on niches, such as travel, art, tennis, soccer, golf, cars, dog owners, and so on. Other social networking sites focus on local communities, sharing local business and entertainment reviews, news, event calendars and happenings.

Most of the social networking websites on the Internet are public, allowing anyone to join. When a user joins the social networking website, that is, when the user becomes a member of the social networking website, the user typically enters his information on a profile page. The information typically pertains to various aspects of the user's demographic information (for example, gender, age, education, place of living, interests, employment, reasons for joining the social networking website, and so on).

A portion of the members do not report their demographic information (for example, their age) at social networking websites. Some members only reveal partial information (for example, their date of birth but not the year), while others report completely false information. For example, at one social networking website, some 15-20% of the members report their age to be 6 or 7 years old, which is known to be inaccurate. For a number of reasons, it would be beneficial to have more accurate demographic information for the members of a social networking website or a website with a social networking-like structure.

SUMMARY

In one general aspect, the present description provides methods and apparatus, including computer program products for providing content based on an estimated actual age. A set of related members is identified for a first member. The first member and each member in the set of related members are members of a social networking website. Each member in the set of related members is connected to the first member in the social network website. Age information associated with one or more members in the set of related members in the set of related members is examined. When a threshold number of members in the set of related members have an estimated actual age within a certain age range, an actual age of the first member is estimated based on the estimated actual age of the members in the set of related members. Content is provided to the first member based on the first member's estimated actual age.

Various implementations can include one or more of the following features. Inappropriate content can be prevented from being provided to the first member, based on the first member's estimated actual age. The first member's estimated actual age can be used in a sentiment analysis application to determine which content to provide to the first member. The content can include advertisements or messages. Providing content to the first member can include displaying the content to the first member on a display of a computing device. The threshold number can include a minimum number of related members in the set of related members, or a minimum fraction of the related members in the set of related members. The estimated actual age for the first member can be used to estimate an actual age for a related member in the set of related members who has not declared an actual age. Educational information provided by the first member can be examined and the first member's actual age can be estimated based on the educational information. The estimated actual age derived from the related members' information can be compared with the estimated actual age derived from the educational information to provide a more accurate estimate of the first member's estimated actual age.

In one general aspect, the present description provides methods and apparatus, including computer program products for performing a sentiment analysis based on an estimated actual age. A set of related members is identified for a first member. The first member and each member in the set of related members are members of a social networking website. Each member in the set of related members is connected to the first member in the social network website. Age information associated with one or more members in the set of related members in the set of related members is examined. When a threshold number of members in the set of related members have an estimated actual age within a certain age range, an actual age of the first member is estimated based on the estimated actual age of the members in the set of related members. The member's estimated actual age is used as an input to a sentiment analysis application for determining sentiments for a demographic that includes the member's age range.

Various implementations can include one or more of the following features. The sentiment analysis can pertain to sentiments about one or more of: events, policies, products, companies, and people. Content can be provided to the first member based at least in part on the results from the sentiment analysis application. The content can include advertisements or messages. Providing content to the first member can include displaying the content to the first member on a display of a computing device. The threshold number include a minimum number of related members in the set of related members, or a minimum fraction of the related members in the set of related members. The estimated actual age for the first member can be used to estimate an actual age for a related member in the set of related members who has not declared an actual age. Educational information provided by the first member can be examined and he first member's actual age can be estimated based on the educational information. The estimated actual age derived from the related members' information can be compared with the estimated actual age derived from the educational information to provide a more accurate estimate of the first member's estimated actual age.

Various implementations can include one or more of the following advantages. More accurate demographic information (e.g., age) can be determined for a larger number of members of a social networking website or a website having a social networking-like structure. Once the members' demographic information has been determined, this information can be used in different applications, such as sentiment analysis to derive opinions by members in a particular demographic category about particular events, policies, products, companies, people, and so on. The demographic information for a member can also be used as a criterion for what content to display to the member, and to prevent inappropriate content from being displayed.

The details of one or more embodiments are set forth in the accompanying drawings and the description below. Other features and advantages will be apparent from the description and drawings, and from the claims.

DESCRIPTION OF DRAWINGS

FIG. 1 shows a schematic flowchart of a process for estimating an actual age of a member of a website in accordance with one embodiment of the invention.

Like reference symbols in the various drawings indicate like elements.

DETAILED DESCRIPTION

The various embodiments of the invention stem from the realization that on social networking websites or on websites with a social networking-like structure, demographic information (e.g., the actual age) of a member can often be estimated by examining supplementary information provided by the member, instead of simply relying on the demographic information provided by the member. The principles for inferring demographic information will be described below by way of example of inferring an actual age (as opposed to a declared age) of a member of a social networking website, and with reference to FIG. 1. It should however be clear that other types of demographic information can also be inferred using similar techniques, and that the embodiments described below are not to be limited to estimates relating to a member's age.

Generally, the processes in accordance with various embodiments of this invention provide better estimates of member's actual ages than previous approaches, which have primarily been focused on determining the age of a member by performing content analysis of blog posts or the like. In the following example, the website will be referred to as a social networking website, but it should be clear that the techniques described below are applicable to any type of website that has a structure similar to a social networking website and that allows members to create personal profiles and to have a network of related members.

As can be seen in FIG. 1, in one embodiment, a process (100) for estimating a member's actual age starts by examining whether the member has declared his age (step 102). If the member has declared an age, one or more additional checks can optionally be performed. For example, the process can examine whether the member's declared age is within a preset range, which may be based on the type or focus of the social networking website. For example, for some social networking websites, about 12-70 years old works well as an age range. If the member's declared age falls outside this range, then it is more likely that the member has not declared his actual age. The process then continues to step 108, where the declared age is used as the estimated actual age, and the process ends.

If it is determined in step 102 that the member has not declared his age, the process continues to examine whether the member has declared any school information (step 104). The school information can include, for example, a starting year, an ending year, or a sequence of years when the member attended an educational institution, such as high school, college, graduate school, or university. For example, if the member declares that he attended University of Colorado in Boulder between 1996 and 2000, it is likely that he was 17 or 18 years old when he entered school as a freshman, and thus that his birth year is approximately 1996−18=1978. The process then continues to step 108, where an estimated actual age is derived based on the school information, which ends the process.

In some embodiments, step 104 can be carried out as an additional check even when it is determined in step 102 that the member has declared his age. For example, if the age derived based on the school information in step 104 falls within about +/−3 years, or within a certain percentage, of the declared age determined in step 102, the process can determine that it is likely that the member has declared his actual age in step 102. If there is more than about a +/−3 year (or above a certain percentage of age) discrepancy between the declared age and the age derived based on the school information, the process can determine that it is unlikely that the member has declared his actual age in step 102.

If it is determined in step 104 that the member has not declared any school information, the process continues to determine whether the ages are known for a threshold of related members (step 106). Related members are typically other persons who are real-life friends, relatives or acquaintances of the member and who the member has invited to join the social networking website. The related members are typically listed on the member's home page or profile page on the social networking website. In some implementations, the related members' ages can be determined as discussed above with respect to steps 102 and 104.

When a threshold of related members fall within a specific age range, it is likely that the member's actual age is also within the same age range. This conclusion is based on, at least in part, the assumption that most related members are peers from either high school or college, and who are thereby in the same age range as the member. The threshold can either be a minimum number, such as 4-8 related members, preferably 5 related members, or a minimum fraction of the related members, such as 10-30% of the related members, preferably 20% of the related members, or a combination of a minimum number and a minimum fraction, which both must be met for the threshold to be reached. For example, if a member has 150 related members in his related members list, and approximately 100 of these related members are classmates from undergrad (which can be verified, for example, by the name of the educational institution and the years of attendance), it is likely that the member belongs to the same age group as the related members. The process then continues to step 108, where the member's actual age is estimated based on the related members' ages, which ends the process. In the unlikely event that a threshold of related members cannot be found in step 108, the process ends and no actual age is estimated for the member. However, as will be discussed in further detail below, the member can later be revisited for a re-determination of his age, after the ages of a sufficient number or fraction of his related members have been determined and the threshold thereby is met.

When the member's actual age has been successfully estimated, this information can be used to estimate actual ages for other members of the social networking website. Thus, by iteratively applying the process of FIG. 1 to members of the social networking website until no more members' ages can be determined, a better overall accuracy of the members' actual age distribution can be achieved. For example, consider a member A, who has incorrectly declared his age to be 40 years old, when he is actually 25 years old. In accordance with the above process, initially, it is assumed that the member is 40 years old, and this age is used in estimating the member's related members' ages. Once the ages of a substantial number of related members have been determined, that is, corresponding to the threshold discussed above, the member's related members' ages can be used to re-estimate the member's actual age. If the re-estimated age ends up being significantly different from the declared age of 40 years old, it can be assumed that the member declared a false age, and the originally estimated actual age for the member can be replaced with the newer re-estimated actual age.

In some implementations, additional website-wide techniques can be used to further validate the estimated actual age of a member. For example, if the website is a social networking website with a "pop and rock music" focus, it is likely that the average member is closer to the age group of 15-25 years old than the age group of 75-85 years old. In some implementations, this can be taken one step further by analyzing the demographics of the entire website community. For example, if 50% of the members are 18-22 years old, it means that there is at least a 50% probability that a member will be in the age range 18-22. This probability can be correlated with the estimated actual age that has been derived for a member, using the methods described above with respect to FIG. 1, and to flag members who may possibly have declared an incorrect age. In some implementations, this can also be used as a crude estimate of the member's actual age if none of the conditions set forth in FIG. 1 above are met.

The mechanisms for retrieving the school, related members, and portfolio-provided age information that can be used in conjunction with the various implementation of this invention are well-known to those of ordinary skill in the art. For example, so-called scrapers or web crawlers can be used to extract structured data from web pages, such as member profile pages on social networking websites. Structured data is any data that follows a pre-defined structure or template. For example, a common template is a 2-column table in HTML (Hyper Text Markup Language). The first column is usually an "attribute" (e.g., location, website, bio, interests, schools, and so on) column, and the second column typically has a "value" associated with the attribute. The scrapers or web crawlers extract this structured data and make it available for further processing, as described above.

It should be noted that the process illustrated in FIG. 1 is based on the assumption that a substantial portion of the members on a social networking website declare an accurate age. A small percentage of members declaring false ages will not affect the process of FIG. 1 negatively, but if a large percentage of the members (such as half or more of the members) declare the wrong age, then the process may be less effective, or may potentially not yield any improved results, as compared to conventional processes for determining ages of website members.

Once an estimated actual age has been determined for one or more members, this information can be used in a variety of applications. For example, in a simple application, a message can be displayed to other members saying that "This person says he is X years old, but we think he is Y years old," possibly along with an indicator that shows how likely the estimate is to be correct.

In other applications, the estimated actual age can be used for determining what types of content (for example, advertisements or messages) to display or block on web pages visited by the member. In yet other applications, the estimated actual age can be used as a factor in sentiment analysis. Sentiment analysis aims to determine the attitude of a person, such as a blogger, with respect to some event, policy, or other topic, for example, a company, a product, a person, and so on. The attitude may be their judgment or evaluation, their affectual state (that is, the emotional state of the blogger when writing) or the intended emotional communication (that is, the emotional effect the blogger wishes to have on the reader). By combining sentiment analysis and estimated actual age information, it is possible to derive sentiments and attitudes within particular demographic groups.

Various embodiments of the invention can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various embodiments of the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the various embodiments of the present invention employ various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The various embodiments of the present invention also relate to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations have been described. Nevertheless, it will be understood that various modifications may be made. For example, the process of estimating an actual age has been described above as a serial process, in which a declared age, school information, and information about related members is examined serially. However, as the skilled reader realizes, these operations can also be carried out independently. Alternatively, they may be carried out in parallel and the results of each operation can subsequently be compared to obtain a more accurate estimated actual age. The website has been referred to in the above example as a social networking website. However, it should be clear that the ideas presented above are applicable to any type of website that allows members to submit information about themselves and to specify a list of related members.

It should also be noted that the thresholds of 4-8 members and 10-30% of the related members mentioned above, are merely examples. The thresholds can vary depending on the structure of the social networks, that is, the average number of related members for each member of the website. In some implementations, the threshold can be determined using a machine learned training set, where the accuracy is maximized by changing the thresholds and arriving at a suitable threshold. Thus, the threshold can be specific to each social networking website. For example, assume that the percentage threshold of related members is 10% and that the ages are known for 9% of a member B's related members. In the first attempt, no call is made on member B's age, since he does not meet the 10% threshold. However, in the meanwhile, some percentage x of B's related members ages, which were previously unknown, can be estimated, assuming that those x percent satisfy the 10% threshold. Thus, in the second try, 9%+x % of B's related members' ages are known. Now, if the 9%+x % is larger than the 10% threshold, then B's actual age is estimated based on the related member's ages. Furthermore, at any point when a member's actual age is estimated, it is possible to validate (to some extent) the age instead of assuming that the age is correct. Accordingly, other embodiments are within the scope of the following claims.

The invention claimed is:

1. A computer-implemented method for providing content based on an estimated actual age, the method comprising:

identifying, by a computer, a set of related members for a first member, wherein the first member and each member in the set of related members are members of a social networking website, and wherein each member in the set of related members is connected to the first member in the social network website;

examining, by the computer, age information associated with one or more members in the set of related members;

when a threshold number of members in the set of related members have an estimated actual age within a certain age range, estimating, by the computer, an actual age of the first member based on the estimated actual age of the members in the set of related members; and providing, by the computer, content to the first member based on the first member's estimated actual age.

2. The method of claim 1, further comprising:

preventing inappropriate content from being provided to the first member, based on the first member's estimated actual age.

3. The method of claim 1, further comprising:

using the first member's estimated actual age in a sentiment analysis application to determine which content to provide to the first member.

4. The method of claim 1, wherein the content includes one or more of: advertisements and messages.

5. The method of claim 1, wherein providing content to the first member includes displaying the content to the first member on a display of a computing device.

6. The method of claim 1, wherein the threshold number includes one or more of: a minimum number of related members in the set of related members, and a minimum fraction of the related members in the set of related members.

7. The method of claim 1, further comprising:

using the estimated actual age for the first member in estimating an actual age for a related member in the set of related members who has not declared an actual age.

8. The method of claim 1, further comprising:

examining educational information provided by the first member; and estimating the first member's actual age based on the educational information.

9. The method of claim 8, further comprising:

comparing the estimated actual age derived from the related members' information with the estimated actual age derived from the educational information to provide a more accurate estimate of the first member's estimated actual age.

10. A computer system operable to provide content based on an estimated actual age, the system comprising:

a communications device operable to exchange information over a communications network;

a memory storing program instructions to be executed by a processor; and a processor operable to communicate with the communications device and the memory and to read and execute the program instructions from the memory to perform the following operations:

identifying a set of related members for a first member, wherein the first member and each member in the set of related members are members of a social networking website, and wherein each member in the set of related members is connected to the first member in the social network website;

examining age information associated with one or more members in the set of related members in the set of related members;

when a threshold number of members in the set of related members have an estimated actual age within a certain age range, estimating an actual age of the first member based on the estimated actual age of the members in the set of related members; and providing content to the first member based on the first member's estimated actual age.

11. The computer system of claim 10, wherein the processor is further operable to read and execute the program instructions from the memory to perform the following operation:

preventing inappropriate content from being provided to the first member, based on the first member's estimated actual age.

12. The computer system of claim 10, wherein the content includes one or more of: advertisements and messages.

13. The computer system of claim 10, wherein the threshold number includes one or more of: a minimum number of related members in the set of related members, and a minimum fraction of the related members in the set of related members.

14. A computer-implemented method for performing a sentiment analysis based on an estimated actual age, the method comprising:

identifying, by a computer, a set of related members for a first member, wherein the first member and each member in the set of related members are members of a social networking website, and wherein each member in the set of related members is connected to the first member in the social network website;

examining, by the computer, age information associated with one or more members in the set of related members in the set of related members;

when a threshold number of members in the set of related members have an estimated actual age within a certain age range, estimating, by the computer, an actual age of the first member based on the estimated actual age of the members in the set of related members; and using, by the computer, the member's estimated actual age as an input to a sentiment analysis application for determining sentiments for a demographic that includes the member's age range.

15. The method of claim 14, wherein the sentiment analysis pertains to sentiments about one or more of: events, policies, products, companies, and people.

16. The method of claim 14, further comprising:

providing content to the first member based at least in part on the results from the sentiment analysis application.

17. The method of claim 16, wherein the content includes one or more of: advertisements and messages.

18. The method of claim 16, wherein providing content to the first member includes displaying the content to the first member on a display of a computing device.

19. The method of claim 14, wherein the threshold number includes one or more of: a minimum number of related members in the set of related members, and a minimum fraction of the related members in the set of related members.

20. The method of claim 14, further comprising:

using the estimated actual age for the first member in estimating an actual age for a related member in the set of related members who has not declared an actual age.

21. The method of claim 14, further comprising:

examining educational information provided by the first member; and estimating the first member's actual age based on the educational information.

22. The method of claim 21, further comprising:

comparing the estimated actual age derived from the related members' information with the estimated actual age derived from the educational information to provide a more accurate estimate of the first member's estimated actual age.

23. A computer program product, for performing a sentiment analysis based on an estimated actual age, the computer program product comprising:

a non-transitory computer-readable storage medium having computer-readable program code embodied therewith, the computer-readable program code comprising instructions to cause a computer to perform the following operations:

identifying a set of related members for a first member, wherein the first member and each member in the set of related members are members of a social networking website, and wherein each member in the set of related members is connected to the first member in the social network website;

examining age information associated with one or more members in the set of related members in the set of related members;

when a threshold number of members in the set of related members have an estimated actual age within a certain age range, estimating an actual age of the first member based on the estimated actual age of the members in the set of related members; and using the member's estimated actual age as an input to a sentiment analysis application for determining sentiments for a demographic that includes the member's age range.

24. The computer program product of claim 23, wherein the sentiment analysis pertains to sentiments about one or more of: events, policies, products, companies, and people.

25. The computer program product of claim 23, further comprising instructions to cause a computer to perform the following operation:

providing content to the first member based at least in part on the results from the sentiment analysis application.

26. The computer program product of claim 23, wherein the threshold number includes one or more of: a minimum number of related members in the set of related members, and a minimum fraction of the related members in the set of related members.

* * * * *